L. W. BUGBEE.
BIFOCAL LENS.
APPLICATION FILED MAY 23, 1921.
1,396,503.
Patented Nov. 8, 1921.
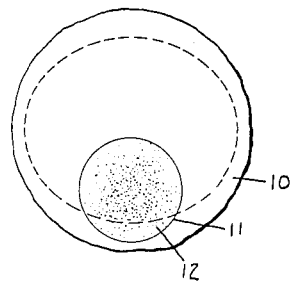
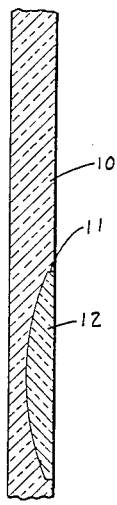
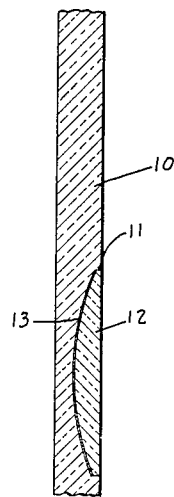
Inventor
LUCIAN W. BUGBEE.
By Lockwood & Lockwood
Attorneys

UNITED STATES PATENT OFFICE.

LUCIAN W. BUGBEE, OF INDIANAPOLIS, INDIANA.

BIFOCAL LENS.

1,396,503.   Specification of Letters Patent.   Patented Nov. 8, 1921.

Application filed May 23, 1921. Serial No. 471,954.

*To all whom it may concern:*

Be it known that I, LUCIAN W. BUGBEE, a citizen of the United States, and a resident of Indianapolis, county of Marion, and State of Indiana, have invented a certain new and useful Bifocal Lens; and I do hereby declare that the following is a full, clear, and exact description thereof, reference being had to the accompanying drawings, in which like numerals refer to like parts.

The object of this invention is to overcome several serious defects in fused and cemented bifocal lenses, known as kryptok lenses, as they have been heretofore made. The most noticeable of these defects is chromatic aberration, due to a positive flint glass of high relative dispersion of light being welded against a negative crown glass of low relative dispersion. To make an achromatic lens, exactly the opposite practice is necesary, which, however, is obviously impossible in the manufacture of such bifocal lenses.

Another defect in the fused bifocal lens, as heretofore made, is due to the injurious effect of the high temperature required by fusing the flint glass commonly used. But if a flint glass having a lower melting point were used, it would aggravate the chromatic aberration, as the low melting flint glass has a very high relative dispersion of light. For this reason it has been necessary to use a flint glass of low relative dispersion and consequently high melting point.

Flint glass of comparatively low relative dispersion also has a low index of refraction. On this account, it is necessary to grind a depression in the major portion of the lens or crown glass, of very strong curvature, and consequently a lens in the stronger powers is unduly thick. For this reason there is also danger, while grinding the prescription surface, of grinding through the crown glass or major portion of the lens and into the flint disk or insert, and thus destroy the lens.

The foregoing defect can be overcome only by using a flint glass of much higher index of refraction than is used in the ordinary practice. Flint glass of a higher index allows the use of much weaker curves in the depression, and thus permits the lens to be much thinner, but, on the other hand, such high index flint glass has an abnormally high relative dispersion with consequent chromatic aberration, to use such an extent that such a lens would be unfit for use. In fact, the chromatic aberration in this type of lens made from species of glass now commonly employed is so great that many people are unable to wear them.

Therefore, the object to be sought is a fused or cemented bifocal lens made with flint glass insert of low melting point, but with a high index of refraction regardless of its necessary relative high dispersion. This result is accomplished by my invention.

This invention consists broadly of a bifocal lens in which the reading segment is made of an insert of flint glass having a chemical nature that will absorb the light at one end or at both ends of the spectrum and will pass the light from the middle region of the spectrum. The added glass for the reading segment may be secured to the main body of the lens by fusing or cementing.

Another feature of the invention consists in making such a lens with a reading segment graduated in color from the center to the circumference because of the graduated thickness of the reading segment inserts.

Another feature of the invention consists of such a reading segment in combination with the major portion of the lens made of glass which is colorless or only slightly tinted.

In the drawings herein Figure 1 is a plan view of a bifocal lens. Fig. 2 is a central section through the same when it is a fused lens. Fig. 3 is a similar section when it is a cemented lens.

In the drawings there is shown a bifocal lens made of two pieces of glass secured together, the major portion 10 being formed of crown glass and provided with a recess at 11 to receive the insert or reading segment 12 which is formed of flint glass of a higher index of refraction than the crown glass.

In manufacturing such lenses the recess is spherically depressed so that it is deeper in the middle than the margin and the flint insert 12 has its inner surface spherically disposed to correspond substantially to the surface of the recess. Therefore, the insert is thicker in the middle than in the margin. The reading segment is secured to the major portion of the lens by fusing the same together under sufficient heat to accomplish said purpose without injury to the glass or by cementing them together by some suitable cement 13.

Preferably in carrying out my invention I use flint glass that will permit the passage through it of light between the spectral absorption lines C and F, or between wave lengths 656μ and 486μ (millionths of a millimeter), this being the region of the visible spectrum through which light passes to which the eye is most sensitive. However, I do not wish to limit the invention to this exact region of the spectrum or character of light rays. The result can be accomplished by cutting off the violet or blue end of the spectrum so that the lens would permit the passage through it of light from approximately one-third of the spectrum, and at the middle of the spectrum.

While the fused or cemented bifocal lens of the character just described corrects chromatic aberration of the lens, it also corrects the same defect which exists in the human eye and, therefore, gives keener and more definite vision.

The foregoing result might be accomplished to a certain extent in the major portion of the lens, by using a similar light absorbing type of glass for the major portion of the lens as for the minor portion, but it would not be very practical because the major portion of the lens is ground almost through in the center of the depression for receiving the reading portion, and, therefore, at that point the absorption would be almost entirely lost and yet that is the point most used while reading. Also the continual use of a colored glass is highly injurious to the eye.

Hence, in carrying out my invention, the major or distance portion of the lens is preferably colorless, or only slightly tinted, thus giving the natural light through the larger portion of the lens. There is no appreciable injury to the eye while using colored glass for reading, because then the unnatural glare caused by the reflection of powerful light from white paper is entirely overcome by the color in the reading segment absorbing and shutting out the injurious rays of light. This unnatural glare causes eye strain and fatigue and when greenish-yellow paper is used, this fatigue is avoided. Thus, in my invention, the normal light rays pass through the upper or distance portion of the lens, while the abnormal glare from white paper is rendered normal by the color in the lower or reading portion of the lens.

Another feature of the invention is the graduation of the color from the center to the circumference of the reading segment by reason of the varied and graduated thickness of said reading segment. This arises by forming the recess with a concave spherical depressed surface and the inner surface of the reading segment with a corresponding convex spherically curved surface, whereby the center of the reading segment is relatively thick and the thickness gradually lessens from the center to the margin. Consequently the color is deeper and more dense at the center and gradually lessens toward the margin, and also the reading portion is of deeper color than the major portion of the lens. This renders such a colored lens easy to the eye.

The invention claimed is:

1. A bifocal lens in which the reading segment is formed of added glass of a higher index than the remaining portion of the lens and which permits the passage through it of only the light at the middle portion of the visible spectrum.

2. A bifocal lens in which the reading segment is formed of added glass of a higher index than the remaining portion of the lens and which absorbs the light at one end of the visible spectrum.

3. A fused bifocal lens in which the reading segment is formed of added glass of a higher index than the remaining portion of the lens and which absorbs the light at both ends of the visible spectrum and passes through it the light at the middle portion of the spectrum.

4. A fused bifocal lens in which the reading segment is formed of added glass of a higher index than the remaining portion of the lens and which passes through it only the light between the spectral absorption lines C and F substantially.

5. A bifocal lens in which the reading segment is formed of added glass of a higher index than the remaining portion of the lens and which passes through it only the light between wave lengths 656μ and 486μ substantially.

6. A bifocal lens including a major portion formed of glass substantially colorless, and a reading portion formed of added glass of a higher index than the major portion of the lens and which permits the passage through it only of the light at the middle portion of the visible spectrum.

7. A bifocal lens including a major portion formed of glass substantially colorless, and a reading portion formed of added glass of a higher index than the major portion of the lens and which absorbs the light at the end of the visible spectrum.

8. A fused bifocal lens consisting of a major portion provided with a recess on one side thereof and glass of a higher index of refraction in said recess, and fused with the major portion of the lens, said added glass being such as permits the passage through it of only the light at the middle portion of the visible spectrum.

9. A fused bifocal lens consisting of a major portion provided with a recess on one side thereof and glass of a higher index of refraction in said recess, and fused with the major portion of the lens, said added glass being such as absorbs the light at one end of the visible spectrum.

10. A fused bifocal lens consisting of a major portion provided with a recess on one side thereof and glass of a higher index of refraction in said recess, and fused with the major portion of the lens, said added glass being such as absorbs the light at both ends of the visible spectrum and passes through it the light at the middle portion of the spectrum.

11. A bifocal lens in which the reading segment is formed of added glass of a higher index than the remaining portion of the lens and which is of a deeper color than the major portion of the lens.

In witness whereof, I have hereunto affixed my signature.

LUCIAN W. BUGBEE.